Patented Mar. 19, 1935

1,995,274

UNITED STATES PATENT OFFICE 1,995,274

OXIDATION CATALYST

James F. Eversole, Charleston, W. Va., assignor to Carbide and Carbon Chemicals Corporation, a corporation of New York No Drawing. Application August 10, 1932, Serial No. 628,222

12 Claims. (Cl. 23—234)

The invention relates to an improved catalyst for use in oxidizing gases, particularly carbon monoxide. The invention includes the catalyst together with the processes for making it and for conducting the oxidation reactions in which it is useful.

The usual and known catalysts for use in the catalytic oxidation of carbon monoxide to carbon dioxide are, in general, composed essentially of iron or iron compounds together with more or less inert materials and various so-called activators or promoting agents, which are usually difficultly reducible or non-reducible metal oxides. The usual method of making such catalysts comprises precipitating ferric hydrate from a solution of ferric nitrate by the addition of magnesium oxide, adding a small amount of potassium chromate, drying the mixed precipitate, igniting the dried mass to the oxides of the metals, and forming the dried oxides into shaped pellets by a procedure involving special handling and equipment to obtain uniformly shaped and sized pellets. The shaped catalyst is then reduced as completely as possible at about the minimum operating temperature of the process in which the catalyst is to be used, usually at about 400° C. A catalyst of the type described before reduction may be composed of about 25% to 35% $Fe_2O_3$, 65% to 75% of MgO, and less than 1% of $Cr_2O_3$ and $K_2O$.

The preparation and use of catalysts, such as the one described, present many difficulties. Foremost among these disadvantages are the difficulties involved in forming the catalyst materials into uniform coherent pellets which will retain their shape. It is very important in the catalytic oxidation of carbon monoxide to obtain thorough and intimate contact between the gas being reacted and the catalyst. In the use of a catalyst prepared as described the gas distribution over the catalyst, hence the efficiency of the process, is dependent upon the passage of the gas through a bed of sized catalyst pellets. If the pellets are not firm, and do not retain their shape, channelling, uneven operation, and poor oxidation results. Hence, it is important for the catalyst to have some form which it will retain, and to have physical characteristics which will not permit the catalyst to disintegrate or become otherwise altered in form. Also, it is expensive to perform the operation of forming pellets of crushed metal oxides. The pellets are usually formed by means of a punch and die press, and the abrasive action of the materials wears the moving parts and necessitates frequent repair. I have also found that the temperature at which the catalyst is reduced has an effect upon its physical strength. It is true that if the catalyst is reduced at or heated prior to use at temperatures above the maximum operating temperatures, i. e. about 725° C., its activity is decreased. For this reason it has been generally conceded by those skilled in the art that the reduction should occur as far as possible below this maximum temperature. I have found that catalysts which were originally strong and firm when reduced at low temperatures exhibited a tendency to swell and disintegrate, and in use gave poor results.

The principal object of my invention is to mitigate or avoid the foregoing difficulties, and to provide an improved catalyst for use in oxidizing gases, particularly carbon monoxide. A further object is to provide a process for preparing the new catalysts which is simple and economical and which avoids the necessity of separate shaping operations.

The new catalyst is active in promoting the desired oxidation reactions, and possesses good mechanical strength, and may be prepared initially in physical shape suitable for immediate use. In general, my new catalyst comprises reduced iron together with at least one element of the group consisting of chromium and manganese as an oxide, and a potassium or sodium salt or oxide supported on granular alumina.

The invention will be apparent from the following description of one method of preparing the catalyst.

A solution of ferric nitrate was prepared by dissolving 100 parts by weight of iron scrap in about 600 parts by weight of nitric acid solution containing concentrated nitric acid and water in the ratio of 2:1. To this solution of ferric nitrate were added 250 parts by weight of activated alumina sized to pass a screen of nominal 2 mesh, or one having openings of about 0.371 inch, but which will be retained on a screen of nominal 4 mesh, or one having openings of about 0.187 inch. This size will be hereinafter referred to by the nominal screen sizes, i. e. 2 by 4 mesh. Twenty-five parts by weight each of potassium dichromate and potassium permanganate were then added to the mixture, and the whole was evaporated to complete dryness.

The dried lumps of alumina impregnated with the other ingredients were then heated to convert the metallic compounds to oxides. This was done by heating the impregnated alumina to 150° C. in air to remove moisture, and then to about 660° C. over a considerable period of time during which NO₂ fumes were evolved. When the evolution of fumes had ceased, the air was excluded, and those oxides which are reducible were reduced by a stream of CO at 660° C. The temperature during this reduction was maintained at about 660° C. by admitting CO₂ or other inert gas with the CO in sufficient quantity to enable the reduction temperature to be closely controlled.

The finished catalyst possessed unusual activity. It operated satisfactorily at lower temperatures than previously known catalysts and produced excellent conversion efficiencies as shown by the following data:

*Inlet gas analysis*

|  | Percent |
|---|---|
| CO | 77 to 79 |
| H₂ | 11 to 12 |
| CO₂ | 6 |
| Inerts (principally nitrogen) | 3 to 6 |

This gas together with three times its volume of steam was passed over the new catalyst. Temperatures were used ranging from 420° to 650° C. and conversions as shown in the tabulated data were obtained.

| Temperature | Outlet gas | | | | | Conversion |
|---|---|---|---|---|---|---|
| | CO₂ | O₂ | H₂ | CO | Inerts | |
| °C. | Percent | Percent | Percent | Percent | Percent | Percent |
| 450 | 37.0 | 0 | 40.8 | 19.4 | 2.8 | 66 |
| 500 | 43.8 | 0 | 47.2 | 5.6 | 3.4 | 88 |
| 550 | 44.2 | 0 | 46.0 | 5.0 | 4.8 | 91.2 |
| 650 | 44.0 | 0 | 46.2 | 5.0 | 4.8 | 91 |

From the foregoing it is apparent that the optimum temperatures for operating the oxidation process with this improved catalyst are those between about 550° and 650° C. However, in many instances slightly lower conversions are desirable and may be obtained with the new catalyst at very low temperatures because of its increased activity in that range.

Many variations in the proportions of the constituents of the catalysts may be made without departing from the invention. In general, the catalyst should contain about 5% to 25% of Fe, about 0.5% to 1.0% of Cr, about 0.5% to 1.0% of Mn, and alkali oxide equivalent to or in slightly greater amount than the Cr and Mn, the balance being alumina. The catalyst may be reduced at temperatures between 600 and 700° C., preferably at about 660° C.

I claim:

1. Catalyst for oxidizing carbon monoxide to carbon dioxide which comprises iron together with alkali oxide and at least one oxide of the group consisting of chromium and manganese supported on granular alumina.

2. Catalyst for oxidizing carbon monoxide to carbon dioxide which comprises reduced iron together with small amounts of alkali oxide and at least one oxide of the group consisting of chromium and manganese supported on granular alumina.

3. Catalyst for oxidizing carbon monoxide to carbon dioxide which comprises iron together with alkali oxide and at least one oxide of the group consisting of chromium and manganense supported on granular activated alumina sized to pass a 2 mesh screen but which is retained on a 4 mesh screen.

4. Catalyst for oxidizing carbon monoxide to carbon dioxide which comprises about 5% to 25% of iron together with small amounts of alkali oxide and at least one oxide of the group consisting of chromium and manganese supported on granular alumina.

5. A catalyst for oxidizing carbon monoxide to carbon dioxide, which comprises about 5% to 25% of iron together with about 0.5% to 1.0% of chromium, about 0.5% to 1.0% of manganese in the form of oxides, and alkali oxide equivalent to the chromium and manganese calculated as dichromate or permanganate, supported on granular activated alumina sized to pass a 2 mesh screen but which is retained on a 4 mesh screen.

6. A catalyst for oxidizing carbon monoxide to carbon dioxide, which comprises about 5% to 25% of iron together with about 0.5% to 1.0% of chromium, about 0.5% to 1.0% of manganese in the form of oxides, and potassium oxide equivalent to the chromium and manganese calculated as dichromate or permanganate supported on granular activated alumina sized to pass a 2 mesh screen but which is retained on a 4 mesh screen and which is substantially identical with a catalyst resulting from the reduction with reducing gas at a temperature between 600° and 700° C. of granular activated alumina impregnated with ferric nitrate, potassium chromate and permanganate in proportions to produce the composition set forth.

7. Process for making oxidation catalysts which comprises forming a solution of ferric nitrate containing a minor proportion of at least one alkali compound of the group consisting of chromates and manganates, adding granular alumina to said solution, eliminating water from the solution containing said alumina, and drying and reducing the resultant impregnated alumina at a temperature between about 600° and 700° C.

8. Process for making oxidation catalysts which comprises forming a solution of ferric nitrate, containing a minor proportion of at least one alkali compound of the group consisting of chromates and manganates, adding granular alumina to said solution, the proportion of alumina to the iron in said solution being about 2.5:1, eliminating water from the solution containing said alumina, and drying and reducing the resultant impregnated alumina at a temperature between about 600° and 700° C.

9. Process for making oxidation catalysts which comprises forming a solution of ferric nitrate containing about 100 parts by weight of iron and about 25 parts by weight each of alkali chromate and alkali permanganate, adding granular activated alumina to said solution in the proportion of about 2.5 parts by weight of alumina to 1 part by weight of iron in said solution, eliminating water from the solution containing said alumina, and drying and reducing the resultant impregnated alumina at a temperature between about 600° and 700° C.

10. Process of oxidizing carbon monoxide which comprises passing steam and carbon monoxide-containing gases at about 400° to 650° C. over a catalyst comprising granular alumina impregnated with iron compounds and at least one alkali compound of the group consisting of chromates and manganates which have been reduced thereon, the contact of the gas being oxidized with said catalyst being effected by distribution of said gas throughout and between the particles of granular alumina.

11. Process of oxdizing carbon monoxide which comprises passing steam and carbon monoxide-containing gases at about 400° to 650° C. over a catalyst comprising granular activated alumina sized to pass a 2 mesh screen but which is retained on a 4 mesh screen impregnated with iron compounds and at least one potassium compound of the group consisting of chromates and manganates which have been reduced thereon, the contact of the gas being oxidized with said catalyst being effected by distribution of said gas throughout and between the particles of granular sized alumina.

12. Process of oxidizing carbon monoxide which comprises passing steam and carbon monoxide-containing gases at about 400° to 650° C. over a catalyst comprising granular alumina impregnated with iron compounds and at least one potassium compound of the group consisting of chromates and manganates which have been reduced thereon, the iron content of said catalyst being about 5% to 25% by weight and the total potassium compounds being between about 0.5% and 2.0% by weight, the contact of the gas being oxidized with said catalyst being effected by distribution of said gas throughout and between the particles of granular alumina.

JAMES F. EVERSOLE.